United States Patent
Frost et al.

(10) Patent No.: US 6,728,662 B2
(45) Date of Patent: Apr. 27, 2004

(54) METHOD AND SYSTEM FOR REMOTELY SERVICING A DETECTION DEVICE

(75) Inventors: Nicholas J. Frost, Langport (GB);
Jason J. Hanlon, Long Ashton (GB);
Andrew B. Lewis, Bristol (GB);
Stephen F. Ridley, Edington (GB);
Michael J. Morgan, Bradley Stroke (GB); Marcus Baker, Port (GB); Gary P. Hiscox, Lower Swanswick (GB);
Richard D. Pearson, Cliftonwood (GB)

(73) Assignee: Radiodetection Limited, Bristol (GB)

( * ) Notice: Subject to any disclaimer, the term of this patent is extended or adjusted under 35 U.S.C. 154(b) by 11 days.

(21) Appl. No.: 10/076,104

(22) Filed: Feb. 15, 2002

(65) Prior Publication Data

US 2003/0158708 A1 Aug. 21, 2003

(51) Int. Cl.⁷ .......................... G06F 19/00; G01R 19/00
(52) U.S. Cl. ...................... 702/188; 702/85; 324/66
(58) Field of Search .......................... 324/323, 66, 67; 702/85, 104, 188

(56) References Cited

U.S. PATENT DOCUMENTS

| | | | | |
|---|---|---|---|---|
| 5,467,286 A | * | 11/1995 | Pyle et al. .................. 364/483 |
| 5,956,487 A | * | 9/1999 | Venkatraman et al. . 395/200.48 |
| 6,170,007 B1 | * | 1/2001 | Venkatraman et al. ...... 709/218 |
| 6,200,025 B1 | * | 3/2001 | Rich .......................... 378/207 |
| 6,240,373 B1 | | 5/2001 | Boggs et al. ................ 702/188 |
| 6,315,062 B1 | * | 11/2001 | Alft et al. ..................... 175/45 |
| 6,381,557 B1 | * | 4/2002 | Babula et al. ............... 702/183 |
| 6,486,439 B1 | * | 11/2002 | Spear et al. ................. 219/136 |
| 6,552,548 B1 | * | 4/2003 | Lewis et al. ................ 324/326 |
| 6,571,191 B1 | * | 5/2003 | York et al. .................. 702/107 |
| 6,578,002 B1 | * | 6/2003 | Derzay et al. ................. 705/2 |
| 6,617,856 B1 | * | 9/2003 | Royle et al. ................ 324/329 |
| 2002/0004798 A1 | * | 1/2002 | Babula et al. ........... 707/104.1 |
| 2002/0059270 A1 | * | 5/2002 | Schlabach et al. .......... 707/100 |
| 2002/0095196 A1 | * | 7/2002 | Linberg ....................... 607/60 |
| 2002/0112041 A1 | * | 8/2002 | Viscount et al. ............ 709/223 |
| 2002/0112042 A1 | * | 8/2002 | Coburn, II et al. ......... 709/223 |
| 2003/0009313 A1 | * | 1/2003 | May et al. .................. 702/188 |
| 2003/0009710 A1 | * | 1/2003 | Grant .......................... 714/37 |
| 2003/0097054 A1 | * | 5/2003 | Sasaki et al. ............... 600/407 |
| 2003/0097426 A1 | * | 5/2003 | Parry ......................... 709/220 |
| 2003/0109938 A1 | * | 6/2003 | Daum et al. .................. 700/11 |
| 2003/0110412 A1 | * | 6/2003 | Neville ........................ 714/25 |

FOREIGN PATENT DOCUMENTS

WO    01/31440    5/2001    .......... G06F/9/445

* cited by examiner

Primary Examiner—Patrick Assouad
(74) Attorney, Agent, or Firm—Baker & Hostetler LLP (57) ABSTRACT

A remotely configurable locator system includes a detection device to locate concealed underground conductors. The detection device is configured to connect to a communications network via a graphical user interface. Also included is a database management tool configured to connect to the communications network and communicate with the detection device via the communications network. A database is included and is adapted to store data related to the detection device wherein the data is configured to be accessed by the database management tool. Finally, the graphical user interface is configured to permit a user to remotely perform one of updating, analyzing, and diagnosing the detection device based upon the accessed stored data.

39 Claims, 9 Drawing Sheets

METHOD AND SYSTEM FOR REMOTELY SERVICING A DETECTION DEVICE

BACKGROUND OF THE INVENTION

1. Field of the Invention

The present invention relates generally to the field of pipe and cable detection devices.

2. Related Art

Pipe and cable detection devices, or simply detection devices, perform a number of operations relating to the detection of underground objects. These operations include locating and tracing underground cables, pipes, wires, or other types of conduits. Characteristics of underground objects, such as the depth of the object, the magnitude and direction of an electric current passing through the object, and path of the object, can also be determined by locators. Thus, the routine operations and functioning of underground objects can be monitored and defects in these objects can be easily detected.

Detection devices use radio frequency radiation to detect underground objects and their characteristics. A detection device often includes a transmitter and receiver. In an active mode, the transmitter emits a signal at one or more active radio frequencies. The transmitter can be positioned in different ways to generate a signal that can be used to detect an object. For example, a transmitter can apply a signal to an object through induction, direct connection, or signal clamping. The receiver detects the transmitted signal and processes the detected signal to obtain desired information. In a passive operating mode, the receiver can detect passive radio frequency signals emitted by the underground object. A receiver can also detect a SONDE. A SONDE is self-contained transmitter provided on certain types of underground objects, such as non-metallic objects. Examples of commercially-available detection devices are locators and tools available from Radiodetection, Ltd., a United Kingdom company. Locators and tools from Radiodetection, Ltd. include devices such as the PXL-2, PDL-2, HCTx-2, LMS-2, LMS-3, PDL-4, PTX-3, and C.A.T. products.

Pipe and cable detection devices typically include software as well as hardware components. The software components must be installed on the device and configured to match associated hardware in the locator. Such installation and configuration in a locator is typically done at a factory prior to sale although it can also be performed by a user. Most configuration updates, however, must be carried out by experienced service technicians. Further, when new frequencies are added, for example, the locators must be recalibrated. These changes to existing configurations require the locator to be coupled to a local facility computer so that the experienced technician can carry out specific configuration and installation operations. However, locators are often used in remote areas or other field locations, making it difficult or costly to connect the locator to a facility computer for software installation or configuration of software. A stand-alone facility computer also may not have the benefit of latest information provided by a detection device manufacturer.

What is needed, therefore, is a locator, which can be configured remotely through a computer network and a small computer. More specifically, a need exists for a locator that can be configured to receive updates, undergo analysis, and receive diagnostic checks from a remote facility via a computer network and use of a portable PC.

SUMMARY OF THE INVENTION

Consistent with the principles of the present invention as embodied and broadly described herein, an exemplary pipe and cable detection devices device system includes a detection device to locate concealed underground conductors. The detection device is configured to connect to a communications network via a graphical user interface. Also included is a database management tool configured to connect to the communications network and communicate with the detection device via the communications network. Next, the system includes a database adapted to store data related to the detection device, wherein the data is configured to be accessed by the database management tool. Finally, the graphical user interface is configured to permit a user to remotely perform one of updating, analyzing, and diagnosing the detection device based upon the accessed stored data.

The present invention also provides an exemplary method for permitting a user to service a detection device configured to locate concealed underground objects. In one embodiment, the invention permits a user to update a detection device configured to locate concealed underground conductors. The method comprises connecting the detection a communications network via a computer enabled graphical user interface and connecting a database management tool to the communications network. The database management tool includes an interface to a database. The method also includes initiating a communications session between the detection device and the database management tool via the communications network. The communications session permits the user to remotely perform at least one of updating, analyzing, and diagnosing the detection device based, at least in part, on data the database.

Features and advantages of the present invention include the ability to control and update a remotely positioned locator device via a computer network, such as the Internet. This capability provides a locator device user and/or technician with the ability to update device configurations while deployed at remote locations where the device will be used. Such a capability will save the associated costs and resources typically required in order to operate and configure the locator devices.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated in and constitute a part of the specification, illustrate embodiments of the invention and, together with the general description given above and the detailed description of the embodiments given below, serve to explain the principles of the present invention. In the drawings.

DETAILED DESCRIPTION OF THE INVENTION

The following detailed description of the present invention refers to the accompanying drawings that illustrate exemplary embodiments consistent with this invention. Other inventions are possible, and modifications may be made to the embodiments from the spirit and scope of the invention. Therefore, the following detailed description is not meant to limit the invention. Rather, the scope of the invention is defined by the appended claims.

It would be apparent to one of skill in the art that the present invention, as described below, may be implemented in many different embodiments of hardware, software, firmware, and/or the entities illustrated in the figures. Any actual software code with specialized controlled hardware to implement the present invention is not limiting of the present invention. Thus, the operation and behavior of the present invention will be described with the understanding that modifications and variations of the embodiments are possible, given the level of detail presented herein.

Figure 1:
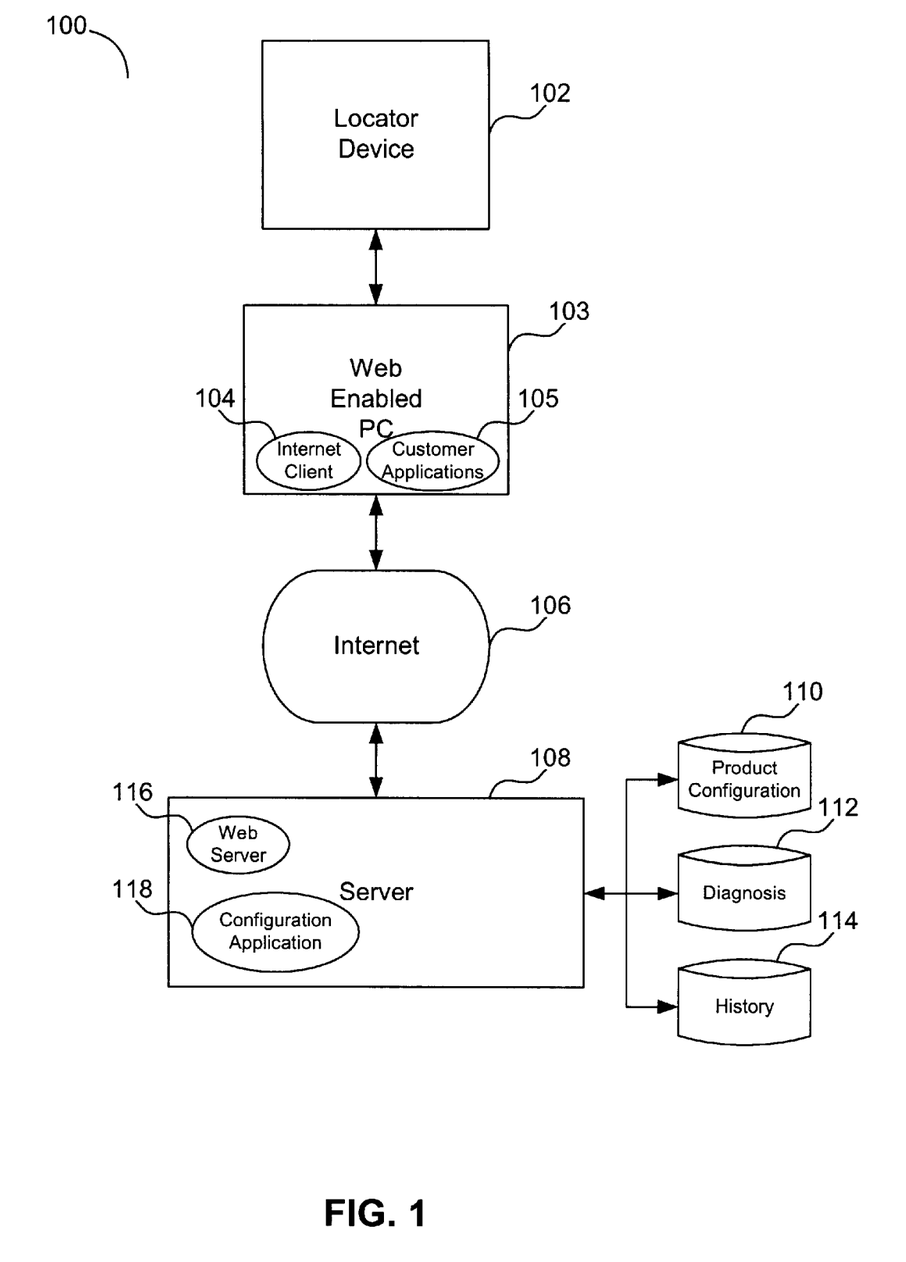
FIG. 1 is a top level block diagram of an exemplary system constructed and arranged in accordance with the present invention.

As stated above, the instant invention provides a web-enabled locator system for detecting underground pipes and cables. FIG. 1 illustrates a block diagram of an exemplary remote locator management system 100, including a locator device 102. An exemplary locator device 102 could be any locator device produced by Radiodetection, Ltd., or other manufacturer. Conventional locator devices include separately-housed transmitting and receiving units as shown in FIG. 2.

Figure 2:
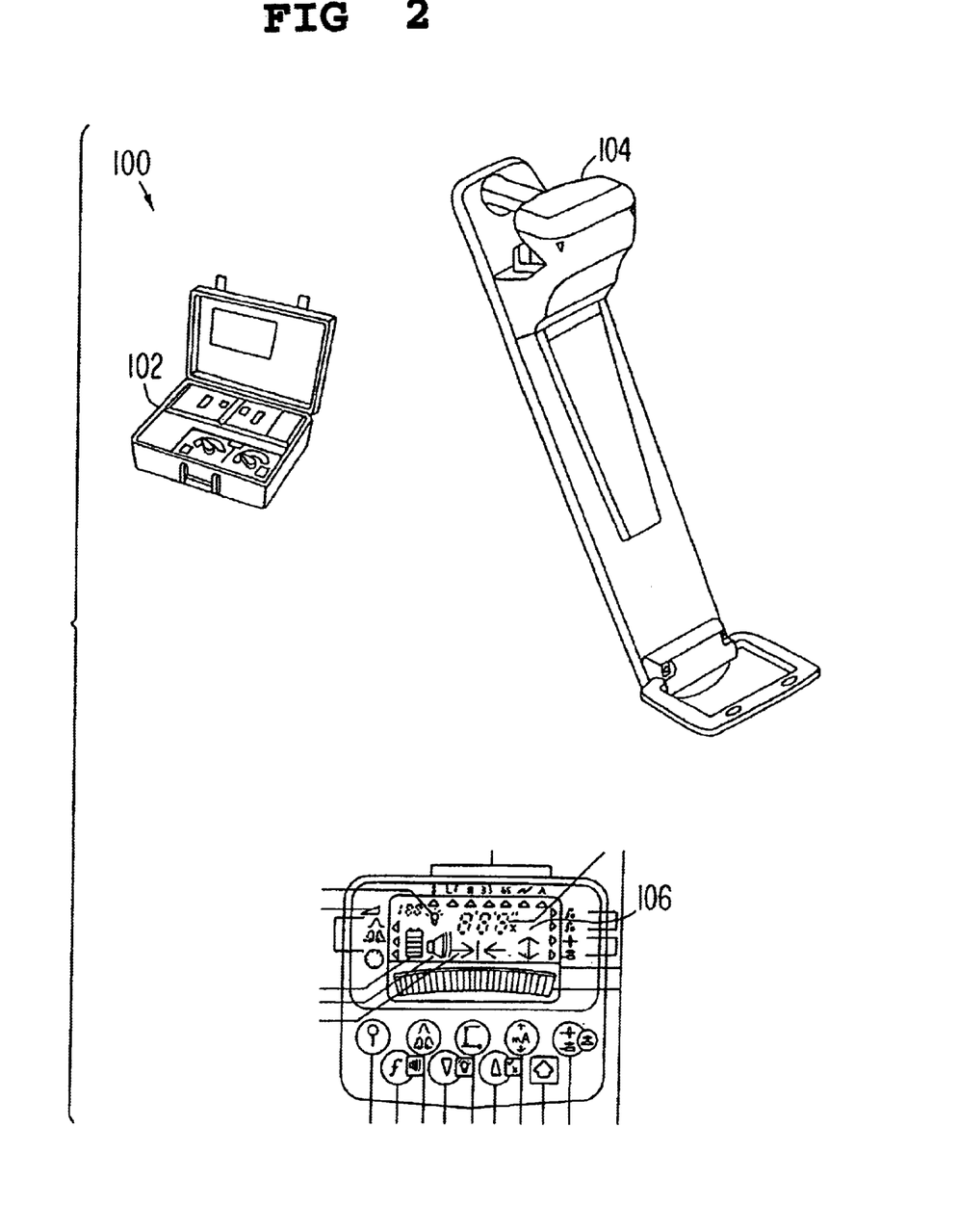
FIG. 2 is an illustration of an exemplary locator device depicted in the block diagram of FIG. 1.

In particular, FIG. 2 shows a conventional locator device, such as the locator device 102, including a transmitting unit 200 and a receiving unit 202. As also shown in FIG. 2, the receiving unit 202 includes a display 204 for monitoring the internal settings and performing functions associated with the locator device 102.

A device identification code, stored in an electrically erasable programmable read-only memory (EEPROM) in the detection device 102, is used by the locator management system 100 to identify a type and model number of the particular detection device. A configuration application software program will automatically log the details of the locator device's operational configuration download at a remotely located communications server 108.

Referring back to FIG. 1, the locator system 100 includes a web-enabled personal computer (PC) 103 configured for connection to a global communications network 106, such as the Internet. The PC 103, among other things, includes an Internet client application 104 and a customer application program 105, both discussed in greater below.

The description of the present invention with respect to the web-enabled PC 103 and the global communications network 106 is illustrative and not intended to limit the present invention. For example, the invention is not limited to a web enabled PC and can be used with any web-enabled device indicating but not limited to a processor, hand-held processor device or personal digital assistant, workstation, server, computer or telephone. The invention is not limited to a global network such as the Internet, and in general can be used with any type of network or combination of networks conveying any area size including but not limited to local area networks, campus wide networks, and/or wide area networks. The network or combination of networks can include wired networks and/or wireless networks communicating via applicable network and communication standards. Further, the locator system 100 can also include a web enabled locator device, which would eliminate the need for the PC 103. Such a web enabled locator device will have a unique internet protocol address to further facilitate communication via the network.

The transmitting unit 200 and the receiving unit 202 of the locator 102, shown in FIG. 2, each includes a communications interface, such as an RS-232 serial interface, for connecting the locator device to a communications bus (not show) of the PC 103. While the RS-232 interface is shown and discussed herein, any suitable communications interface can be used in the instant invention. The PC 130 is configured to connect directly to the global communication network 106. The network 106 provides a communications path between the PC 103 and a communications server 108, which hosts applications software and locator device databases.

The PC 103 configured to include installment of Internet browser software and software applications for transferring data between the browser and the communications interface of the transmitting unit 200 and the receiving unit 202. The web browser also provides a mechanism for a system user to remotely configure and diagnose the remote locator device 102 via the PC 103. Exemplary web browsers include commercially available browsers such as Netscape Navigator. The communications server 108 hosts web server software 116 which facilitates the formation of a number of web pages that can be accessed through the web browser installed on the PC 103. Although the Apache web server software is used in the present invention, any suitable web server software can be used. Exemplary web pages are shown in FIG. 3.

Figure 3:
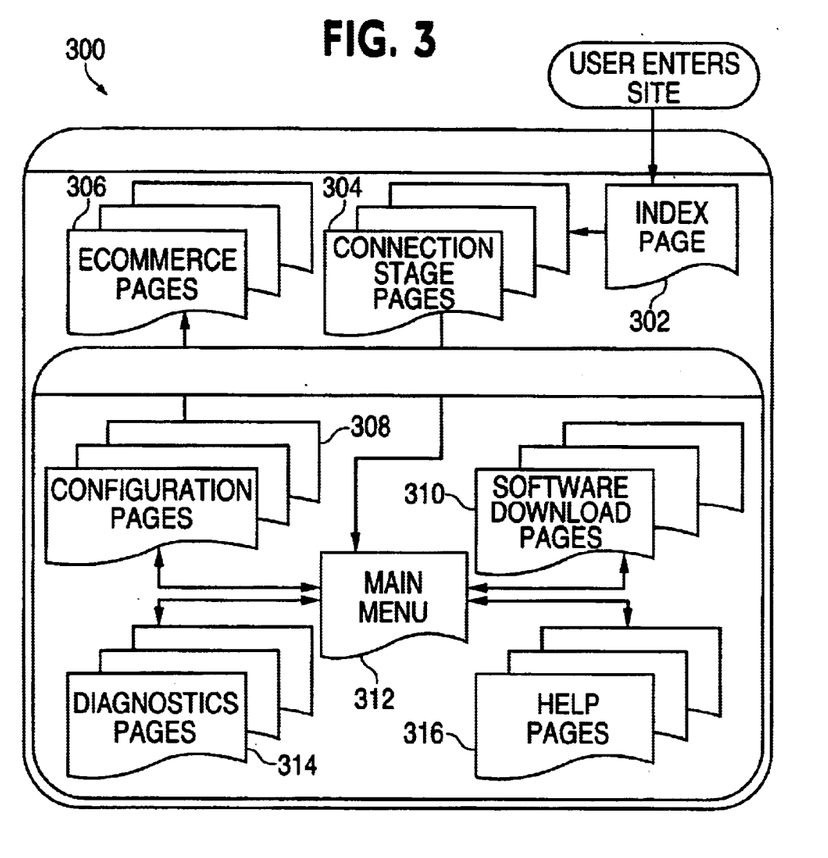
FIG. 3 is an illustration of exemplary web pages presented to a user via a graphical interface associated with the FIG. 1.

FIG. 3 provides an illustration of an exemplary web page 300, including a number of sub-pages. A user can employ the PC 103, after connecting the PC 103 to the global communications network 106, to communicate with the remotely positioned communications server 108. The sub-pages 300 provide the user with a graphical representation of available features for managing the locator device 102.

Features accessible via the sub-pages include, for example, an index page 302 for providing the user a means to quickly scroll through available options, and connection stage pages 304 for establishing the required transmission protocols to facilitate communications. Next, exemplary e-commerce pages 306, configuration pages 308, and software download pages 310 are provided. The e-commerce pages 306 provide a mechanism for a system administrator to collect revenue from users, in near real-time, for services used in connection with a particular detection device.

The configuration pages 308 and the software download pages 310 respectively provide a user with the ability to remotely configure the detection device and download a new configuration and/or software/firmware updates. Finally, an exemplary main menu page 312, diagnostics pages 314, and help pages 316 are also provided. The main menu page 312 provides the user with a graphical representation of features and options specifically tailored to a particular detection device. The diagnostics pages 314 graphically present the user with a list of available diagnostic features and the help pages 316 provide the user with on-line real-time help for resolving problematic detection device issues. The web pages 300 are made available through a web server hosted on the communications server 108 which may be housed in a configuration management facility. The configuration management facility, which can be a central management or production facility, can be located in the vicinity of the locator device 102 or it could be located thousands of miles away.

As stated above, the communications server 108 also performs an integral role in managing the remotely positioned locator device 102 via the global communications network 106. The communications server 108 includes a configuration application program 118 for managing communication with the locator system 100. As shown in FIG. 1, the communications server 108 also provides access to product related databases. In particular, the communications server 108 is coupled to a product configuration database 110, a diagnostics database 112, and a history and use database 114.

The product configuration database 110 includes data necessary for configuring locator devices. For example, an exemplary product configuration database stores setup parameters for the detection device 102 transmitter unit 200 and receiver unit 202, including sets of parameters customized for particular users. The diagnostics database 112 includes information essential to performing locator device diagnostics. An exemplary diagnostics database stores routines that may be run to test various subsystems in the transmitter unit 200 and the receiver unit 202. The history and use database 114 includes historical records of previous software downloads, previous calibrations, and other historical data. An exemplary product history and use database can store "cradle to grave" profiles of each unit in existence, including records of hardware and firmware version numbers, calibrations, firmware downloads, and hardware repairs.

The product configuration database 110 also includes data associated with cost accounting and user payments. That is, the product configuration database 100 includes price data associated with particular product configurations and diagnostic features selected by the user. When the user downloads product configurations and diagnostic features, the locator system 100 can be configured to accept payment from the user via the communications network 106. Payment can be made using a variety of formats, such as a charge card or debit account. For example, in the case of up-grades and new configurations, the server 108 calculates an appropriate payment amount based upon individual user arrangements and/or predetermined customer discounts and conveys this amount to the user. The user can then use the charge card or the debit account remit payment.

The locator system 100 is also configurable to extend a free or discounted trial period to selected users with the locator device 102 being programmable to operate only during the trial period. Upon expiration of the trial period, the locator device 102 and/or the downloaded configuration will shut down immediately absent payment or other arrangements. Reinstatement of the locator device 102 is carried out via the communications network 106 and the processing of an appropriate payment via the credit card, the debit account, or other similar arrangement.

Figure 4:
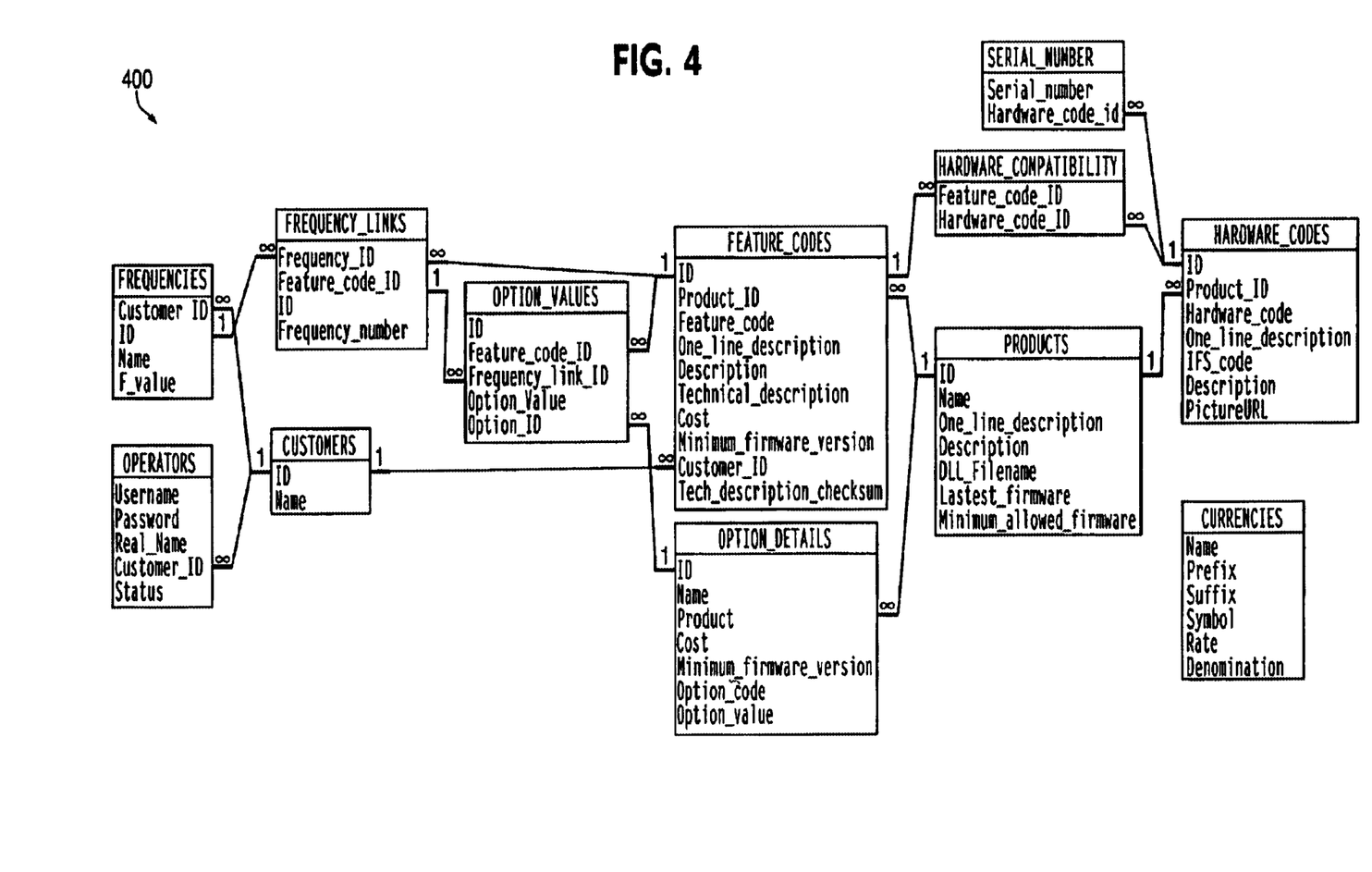
FIG. 4 is a depiction of an exemplary database format used in the present invention.

Next, an exemplary relational database structure 400 is shown in FIG. 4. Using the exemplary database structure 400, it is possible to list all configurations used by a particular user. It is also possible to list the serial numbers of devices held by a user or determine if a user has devices with a particular software version.

In addition to the information discussed above, the database also stores dynamic library links (DLLs) related to particular locator models. For example, a particular DLL might know how to configure one model and a different DLL would be used to configure a different model. An exemplary data base will also include other information such as the specific frequencies allocated, specific feature codes or configurations used, options information, calibration data, etc. The communications server 108 can use conventional data storage techniques, such as the Open Database Connectivity (ODBC), to communicate with the configuration database 110.

The configuration application 118 will act as an interface between other download applications accessed by the 103 through the global communications network 106 and the configuration database 110. Communication via the global communications network 106 can be through any suitable communications interface, such as, for example, WinSock sockets.

Figure 5:
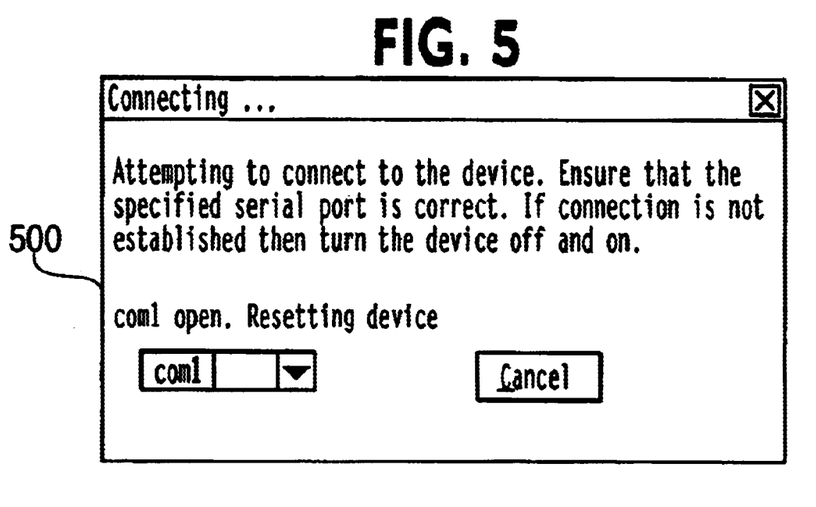
FIG. 5 is a graphical interface depiction of a connecting dialogue presented to a user via a graphical user interface.

Upon initial execution, the configuration application 118 will automatically detect any newly connected locator devices and present the detection results to the user via a dialogue such as an exemplary dialogue 500 shown in FIG. 5. Once the locator device connection process has been completed, the configuration application 118 will then request the locator device's identification code, store in the device's EEPROM, and all of the other associated device details.

Figure 6:
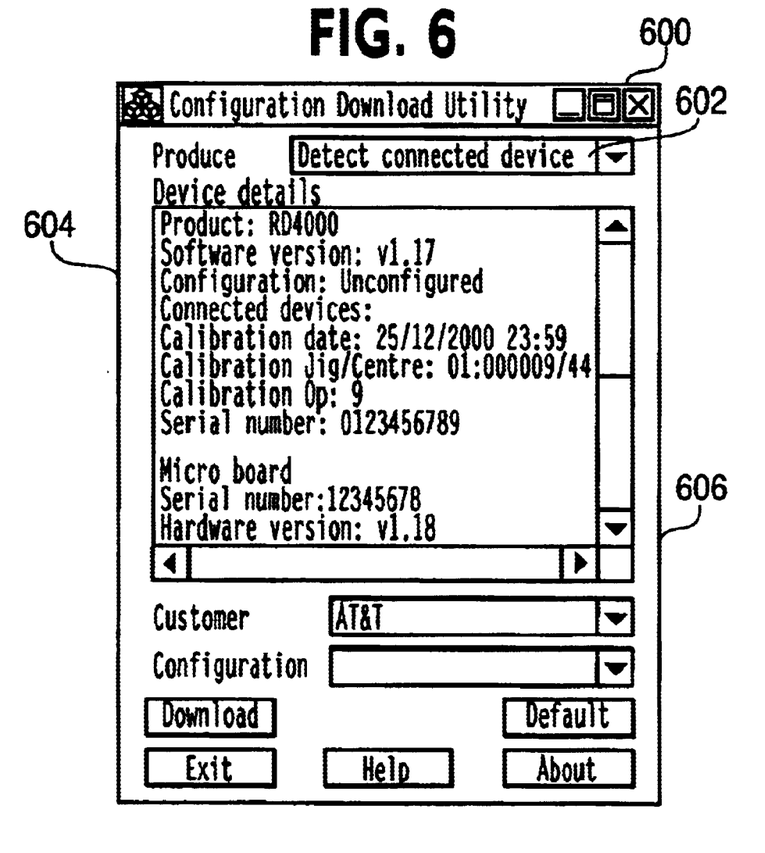
FIG. 6 is a graphical user interface depiction of a device detection dialogue.

As shown in FIG. 6, an exemplary confirmation dialogue 600 will be displayed to convey all of the associated details that have been detected pertaining to the associated locator device. For example, a detection status indication 602 is presented to the user indicating confirmation of the detection of a connected device. Next, a device details window 604 is presented to the user to convey information such as the particular product type, calibration date, and device serial number etc. Also, other windows, such as a customer window 606, are presented to the user to convey additional relevant details that may be helpful to ensuring that the detection device can be properly configured.

Figure 7:
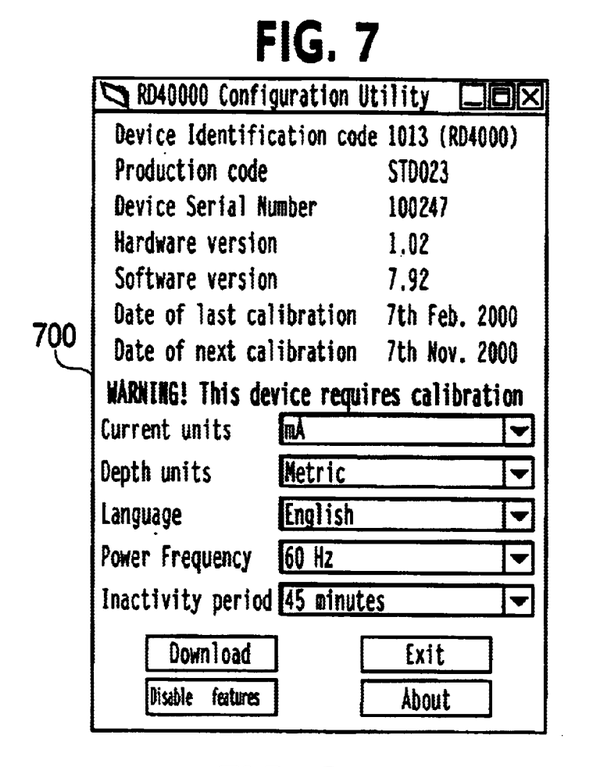
FIG. 7 is a graphical interface depiction of text associated with an exemplary connected locator device requiring calibration.

Next, as shown in FIG. 7, the configuration application 118 will check the locator device's software version and will display an exemplary notice dialog 700 indicating that the device requires calibration, or that the software should be updated etc. The dialogue 700 might also display an error message that the software version is incompatible with the application. When appropriate, the dialog 700 will be changed so that it also supplies a web page indicating where new software downloads can be obtained.

The communications server 108 acts as a focal point for managing related software applications that are operating in support of the remotely configurable locator device 102. In this capacity, the server 108 handles data requests from all other applications programs over the global communications network 106 via the web browser installed on the PC 103.

Figure 8:
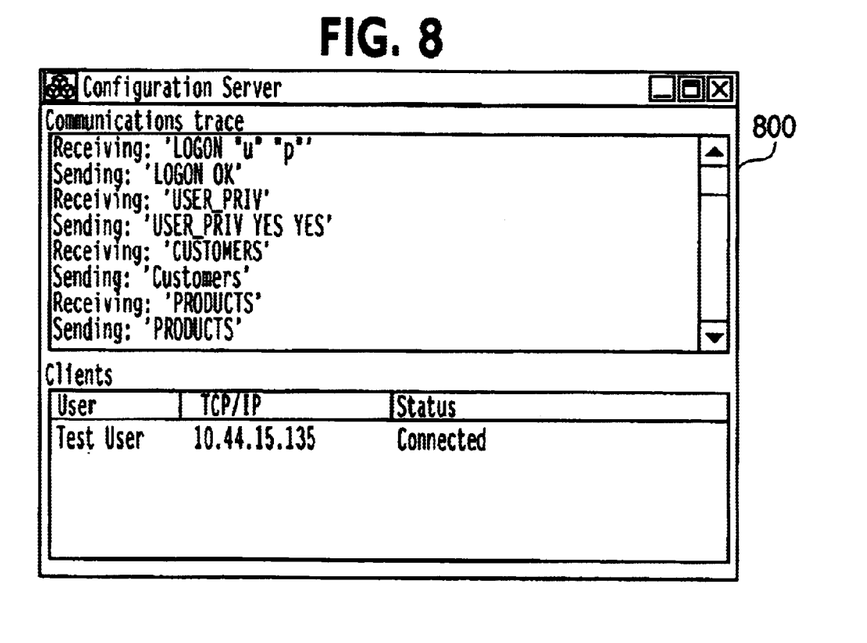
FIG. 8 is a graphical user interface depiction of an exemplary configuration server main window.

An exemplary graphical user interface of a communication server main window 800 is shown in FIG. 8. The communication server 108 is designed to run constantly and unaided. Further, it will display which users are connected to the locator system 100 and will display a listing identifying all connected users.

The communications server 108 also manages traditional network housekeeping functions associated with the locator device 102, the PC 103, and the global communications network 106. For example, the configuration server 108 will disconnect any users who are idle for a predetermined amount of time. For purposes of illustration only, a maximum idle time of five minutes will be discussed. Under this scheme, if the user desires to send a command to the communications server 108, they should first check the time since their last sent command. If this time is greater than four minutes, based upon the exemplary five minute timeout period, the user should disconnect, re-connect, re-logon and then send the command. This is possible since the connection to the communications server 108 is stateless. This scheme ensures that configuration server 108 will not be clogged down by people connected to the server but may not be using it.

The communications server 108 is hosted on a computer, such as an exemplary Dell Server platform running NT 4. At a high level, the communications server 108 manages administration of configurations associated with the locator device 102 and is a doorway into the databases 110, 112, and 114. The communications server 108 is configured to accept multiple connections from users via the web pages 300 implemented on the PC 103. This web enablement feature of the remote locator management system 100 provides users with the ability to configure, download, and pay for new device configurations via the global communications network 106, as addressed above.

Figure 9:
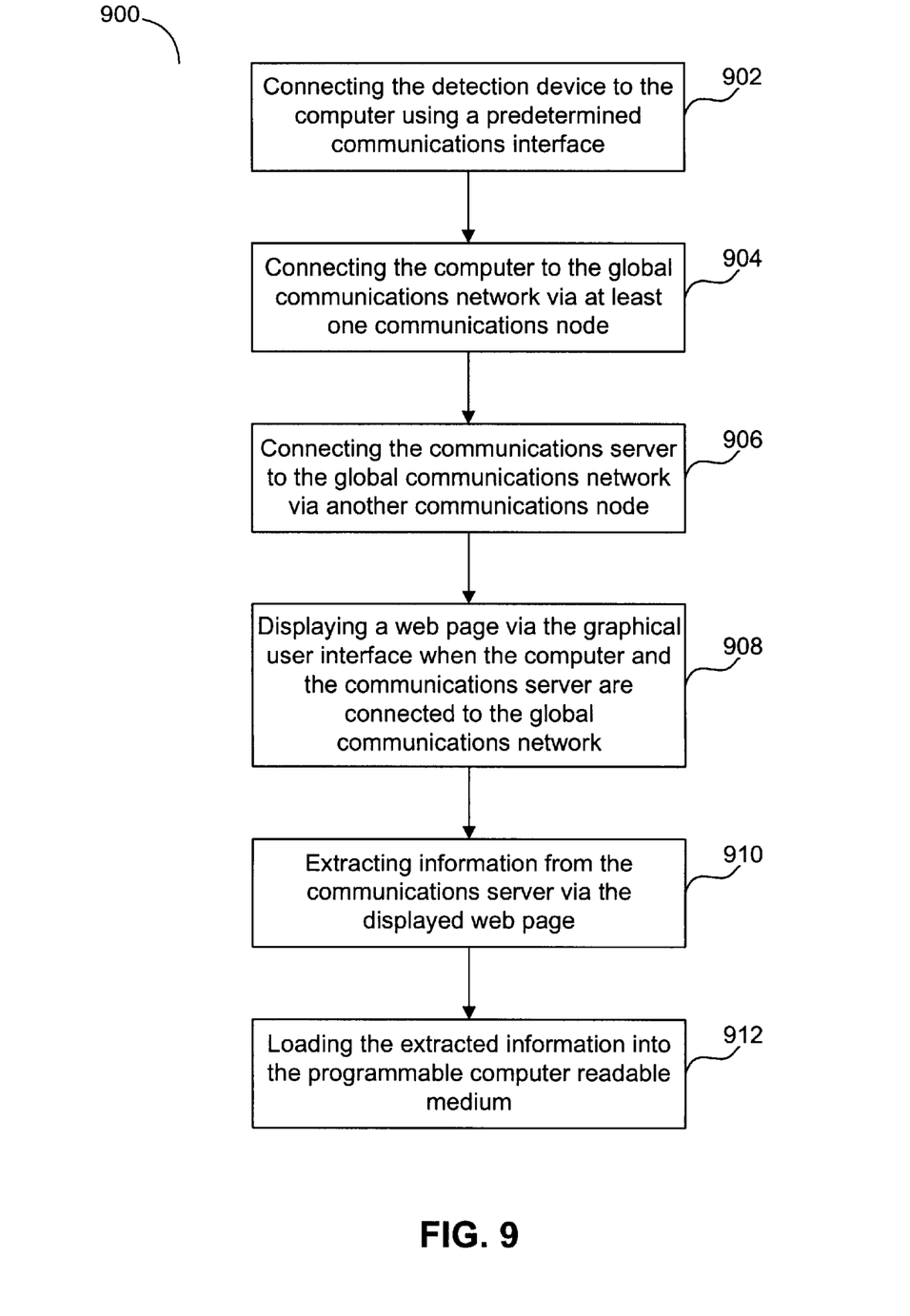
FIG. 9 is a block diagram representation of an exemplary method of configuring a locator device in accordance with the present invention.

FIG. 9 illustrates an exemplary method 900 of configuring the detection device 102 (blocks 902–912). In FIG. 9, and as stated above, to configure or set up the detection device 102 the user connects the detection device 102 to the PC 103 as shown in block 902. Next, the user will ensure that the computer 103 is connected to the global communications network 106 as indicated in block 904. After connecting the communications server 108 to the PC 103, as required in block 906, a dialogue such as the dialogue 500, is presented to the user to confirm connectivity, as indicated in block 908. Finally, information can be extracted from the one of the exemplary databases, such as the product configuration database 110, and loaded into the detection device 102, as indicated in blocks 910 and 912 respectively.

Another integral component of the configuration application 108, although installed on the PC 103, is the Internet Client 104. The Internet client 104 is specifically used to facilitate the exchange of communications protocols between the PC 103 and the remotely located communications server 108. The Internet client 104 and the communications server 108 will communicate using the exemplary communications interface, such as Winsock sockets, as previously discussed. The nature of the communication is such that at times the client 104 needs to initiate and/or co-ordinate actions and at other times the communications server 108 will need to initiate and/or co-ordinate actions.

For example, the client 104 might need to inform the server 108 when it requires the performance of a task, such as downloading. But the communications server 108 needs to take control when downloading because only the communications server 108 has knowledge of how to configure the products (since the Intern client is generic). Therefore, a scheme will be employed whereby the client 104 is usually the master, but the communications sever 108 can send commands when processing a client command.

Although the web server application 116 and the configurations application 118, hosted on the communications server 108 are critical to the operation of the locator system 100, other applications programs that are hosted on the web-enabled PC 103, are also essential. One such program is the customer applications program 105, which is hosted on the PC 103 and is provided to all locator device service personnel. The configuration application program 105 is written to be unique to a particular locator device. This application will allow customers to be able to set some customer features (such as the depth units—Imperial or Metric) and also provide the ability to disable other features to simplify operations for other users.

More importantly, the customer application program 105 will allow a blank locator device to be configured with a particular device configuration set (or feature code). The configuration sets are stored in the databases 110, 112, and 114. The customer application program 105 will display the available sets and allow the user to choose any desirable configuration.

The customer application program 105 will allow users to configure a sub set of configurations and view a sub set of stored data of the device.

The following options, for example, will be configurable by the user:

(a) Current display (mA or dB)

(b) Depth units (Imperial or Metric)

(c) Language (English, Italian, Dutch, German, French, Spanish)

(d) Power Frequency (50 Hz or 60 Hz)

(e) Inactivity period (disabled or 1 to 60 minutes)

(f) Multi-CD selection (by menu or by frequency key)

The following data is viewable within at least one of the databases:

(a) Device Identification Code (b) Device Feature code (c) Device Serial Number (d) Hardware Version Number (e) Software Version Number (f) Date of last calibration A configuration download application (not shown) will have an network connection to the remotely located communications server 108. It will allow users to download a particular configuration to the locator device 102. The configuration is selected from a range of pre-set configurations stored at a central management facility (not shown) that houses the communications server 108. Each configuration at the central management facility will have a unique feature code.

The customer application program 105 will be generic and not specific to any particular locator device. For compatibility with the customer application program, however, devices must connect and communicate using an appropriate communications protocol, such as an exemplary serial line interface protocol (SLIP). When the remote locator management system 100 is activated, the configuration download application will attempt to connect with at least one of the databases associated with the remotely located communications server 108.

Customer and configuration fields are presented to the user via a dialogue in a display screen of the PC 103 and the user is then requested to select a feature code. A user list is compiled and compared with all of the users listed in at least one of the databases of the communications server 108. From this information, a configuration list can be formed and then filled with all available feature codes for the selected locator device. If a particular user is selected, the feature codes are sorted by codes previously loaded by the particular user and codes that have not been previously used by that user.

The user will be able to disconnect the device and reconnect another device with out the need to re-select configuration. This will allow a number of devices to be configured with the same configuration with a minimum level of effort.

The user will be able to use the web site via one of the web pages 300, for example, to configure the device's current display (mA or dB), language power frequency (50 Hz or 60 Hz), inactivity period (disabled or 1 to 60 minutes), and many more. Additionally, the user will have the ability, via the web site, to disable selected features on the device.

This feature can also be used to download a configuration set that has already been defined. The locator system 100 will interrogate the locator device feature code database and list all feature codes. Each feature code represents a unique configuration definition. An additional code, the locator device identification Code, is stored in the EEPROM of the locator device 102. The identification code will be used to determine the device's particular hardware version and type.

When a configuration set is initially defined, it will be assigned a feature code and store in the product configuration database 110 of the communications server 108. The system 100 will ask for the user name and a brief non-technical description of the configuration set. The system 100 will then generate a unique feature code for the configuration set that the user can use when ordering, for example, new locator devices.

The customer applications program 105 can be executed on a personal computer (PC), running for example, the windows operating system. This feature, among other things, will assist in detection of the device's connection and display a dialog box with the current settings for parameters such as the current display, language, etc., as discussed above. The user can also change settings, or for example, disable particular frequency settings.

Finally, diagnostics and calibration features are available for use with the remote locator management system 100 and can be hosted on the PC 103. The user will not be expected to enter commands to activate the diagnostics feature. Selected diagnostic tests can be implemented by selecting the appropriate test from an applications menu presented via a dialogue on the display of the PC 103.

To minimize production costs, for example, the locator device 102 can be calibrated using a fixed set of parameters, such as calibration frequencies. The system's configuration program will extract the calibration values for each of the calibration parameters, perform a comparison, then calculate any offset parameters using conventional calibration algorithms and technologies.

To activate the diagnostics feature, for example, the user will put the locator device 102 in a test mode. The test mode will use information extracted from the locator device 102 in real-time and information retrieved from the diagnostics database 112. As a result, a continuous stream of diagnostic data will be printed while the user performs various other actions. For example, an antenna test would print the antenna readings while the user moves a magnet near them. The user can also instruct the locator device 102 to perform an internal self-test. Such a test will, for example, determine the status of the EEPROM and an associated flash memory in the device 102.

The diagnostics tool also includes a feature for retrieving the history of a device from the history and use database 114 and logging details of a repair via the Internet. The device history can include, for example, repair details, dates related to firmware downloads to the device, configuration downloads, calibrations, and more.

Figure 10:
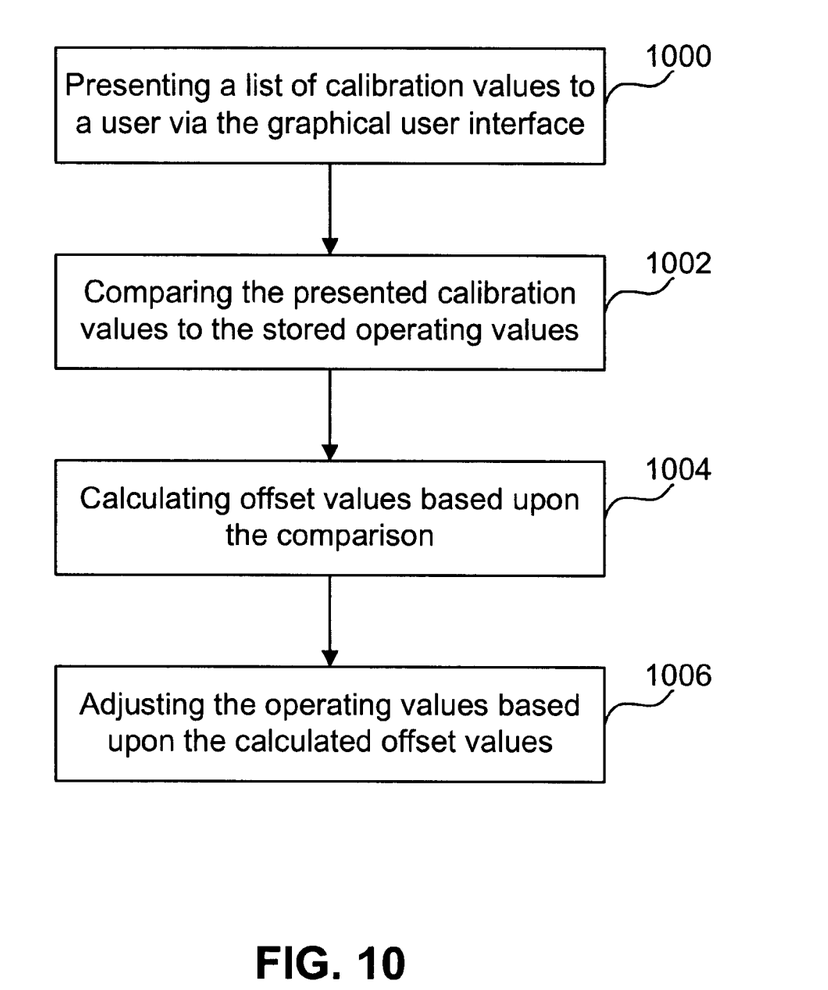
FIG. 10 is a block diagram representation of an exemplary method of calibrating a locator device in accordance with the present invention.

FIG. 10 illustrates an exemplary method of calibrating the detection device 102 using the system 100 (blocks 1000–1006). When the user desires to perform a calibration function, the user may enter the calibration mode of the locator device 102. The user is then presented with a list of calibration values via the display 202 of the locator device 102 or via screen of the PC 103, as indicated in block 1000 of FIG. 10. When the user has selected the appropriate calibration values, the system 100 performs a comparison between the newly selected calibration values and operating values currently used by the locator device 102, as indicated in block 1002. Next, offset values are determined and the operating values of the locator device 102 are adjusted based upon the offset values, as indicated in block 1004 and 1006 respectively.

Figure 11:
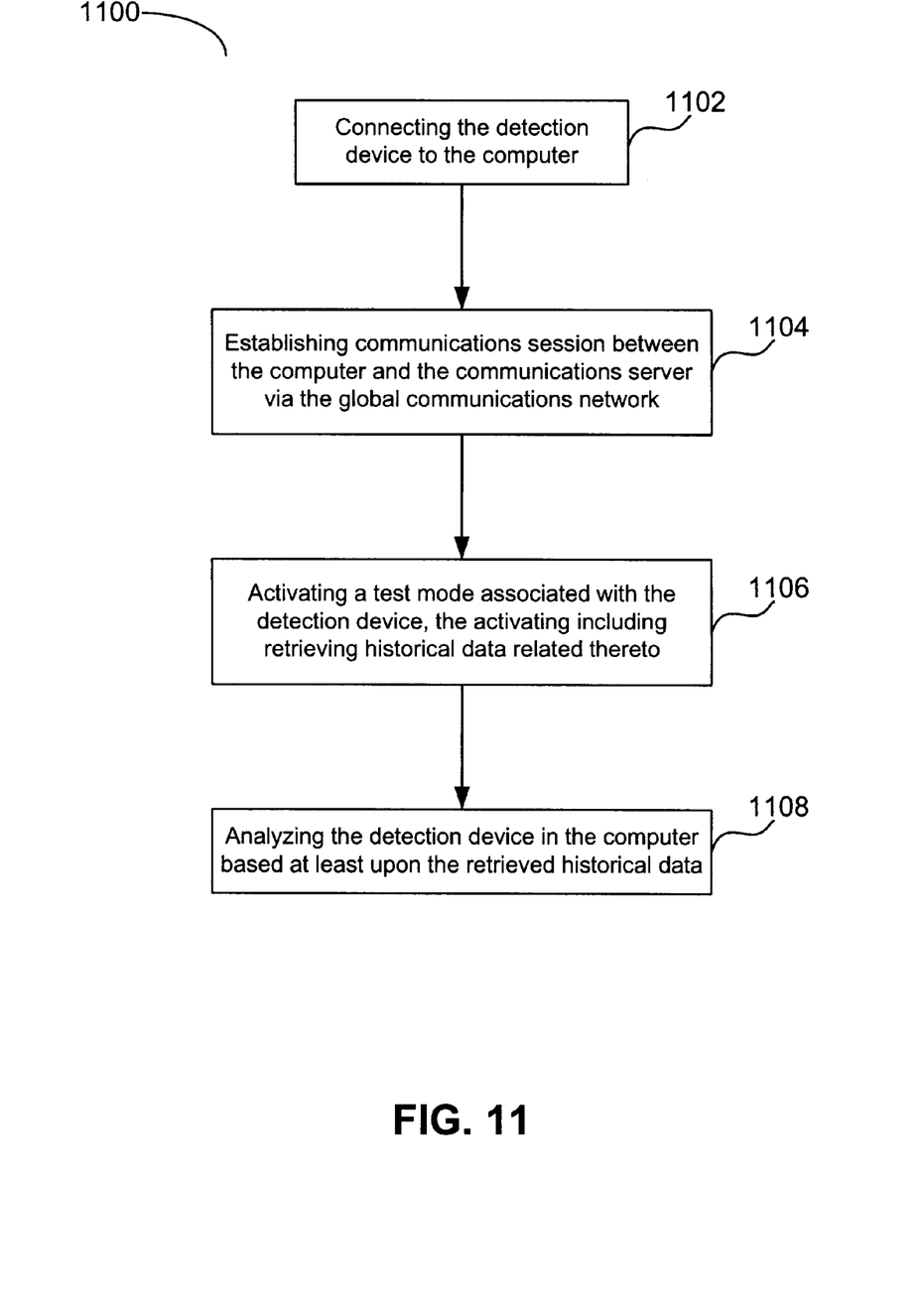
FIG. 11 is a block diagram representation of an exemplary method of diagnosing a locator device in accordance with the present invention.

Similarly, FIG. 11 presents an exemplary method 1100 of diagnosing the locator device 102 using the system 100 (blocks 1102–1108). In FIG. 11, a user will first connect the detection device 102 to the 103, as indicated in block 1102 and establish a communications session between the PC 103 and the server 108 via the global communications network 106, as shown in block 1104. The user can then activate a test mode, which includes retrieving historical data from the history and use database 114 as described in block 1106 of FIG. 11. Finally, the system 100 will diagnose the locator device 102 based upon the retrieved historical data, as illustrated in block 1108.

By using the locator management system 100 along with an exemplary PC and a global communications network such as the Internet, a user of the locator device 102 can remotely configure, diagnose, and calibrate the locator device 102. Additionally, new software can be downloaded and repairs can be made to existing software and/or hardware versions.

The foregoing description of the preferred embodiments provide an illustration and description, but is not intended to be exhaustive or to limit the invention to the precise form disclosed. Modification and variations are possible consistent with the above teachings or may be acquired from practice of the invention. Thus, it is noted that the scope of the invention is defined by the claims and their equivalents.

What is claimed is:

1. A method to permit a user to service a detection device configured to locate concealed underground conductors, the method comprising:

connecting the detection device to a communications network via a computer enabled user interface;

connecting a database management tool to the communications network, the database management tool including an interface to a database; and initiating a communications session between the detection device and the database management tool via the communications network, the communications session permitting the user to remotely perform at least one of updating, analyzing, and diagnosing the detection device based, at least in part, on data stored in the database, wherein the communications session includes communicating via at least one from the group including a wireless communications link in accordance with wireless standards and a wired communications link.

2. A system comprising:

a detection device to locate concealed underground conductors, the detection device being configured to connect to a communications network via a graphical user interface, wherein the graphical user interface is configured to permit a user to remotely perform one of updating, analyzing, and diagnosing the detection device based upon the accessed stored data;

a database management tool configured to connect to the communications network and communicate with the detection device via the communications network, wherein the communications network includes at least one from the group including a wireless communications network based upon wireless communication standards and a wired communications network; and a database adapted to store data related to the detection device, the data being configured to be accessed by the database management tool.

3. An apparatus including a processor, a memory, and a graphical user interface, the apparatus comprising:

a first interface configured to connect the processor to a removable detection device;

a second interface configured to connect the processor to a wide area communications network; and a memory having stored thereon instructions to cause the processor to display at least one web page via the graphical user interface;

wherein the web page is configured to permit the detection device to received data via the wide area communication network.

4. The apparatus of claim 3, wherein the first interface includes a Winsock socket and an RS-232 serial interface.

5. The apparatus of claim 3, wherein the detection device detects by processing radio frequency signals.

6. The apparatus of claim 3, wherein the detection device is of a type available from Radiodetection, Ltd.

7. The apparatus of claim 3, wherein the detection device detects underground devices.

8. The apparatus of claim 7, wherein the underground devices include at least one of pipes and cables.

9. The apparatus of claim 3, wherein the graphical user interface permits a user to view data and input data through a computer display device.

10. The apparatus of claim 3, wherein the wide area communications network includes the Internet.

11. The apparatus of claim 3, wherein the stored instructions include a web browser.

12. The apparatus of claim 3, wherein the apparatus is a personal computer.

13. A method for calibrating a detection device in a system, the system including a computer having a graphical user interface, a global communications network, and a communications server positioned in a location remote from the computer and the detection device, the detection device operating based upon stored operating values, the method comprising:

presenting a list of calibration values to a user via the graphical user interface, the list of calibration values to a user via the graphical user interface, the list of calibration values (i) being associated with the detection device and (ii) being extracted from the communications server via the global communications network;

comparing the presented calibration values to the stored operating values;

calculating offset values based upon the comparison; and adjusting the operating values based upon the calculated offset values.

14. The method of claim 13, wherein the calibration values include calibration frequencies.

15. The method of claim 13, wherein the global communications network includes the Internet.

16. The method of claim 13, wherein the communications server is coupled to a database.

17. The method of claim 13, wherein the communications server includes a web server.

18. The method of claim 17, wherein the web server includes at least one from the group including an Apache web server and a Microsoft Internet information server.

19. The method of claim 13, wherein the adjusting step is performed automatically.

20. A method for configuring a detection device including a computer readable medium, the detection device being used in a system, the system including a computer having a graphical user interface, a global communications server, the computer being configured for being positioned in a location remote from the communications server, the method comprising:

connecting the detection device to the computer using a predetermined or selected communications interface;

connecting the computer to the global communications network via at least one communications node;

connecting the communications server to the global communications network via another communications node;

displaying a web page via the graphical user interface when the computer and the communications server are connected to the global communications network, the web page facilitating communication between the computer and the communications server via the global communications network;

extracting information from the communications server via the displayed web page; and loading the extracted information into the computer readable medium.

21. The method of claim 20, further comprising determining a detection device type based upon the loading.

22. The method of claim 20, wherein the communications server associates a particular feature code with the loaded extracted information.

23. The method of claim 22, wherein the associating is performed automatically.

24. The method of claim 20, wherein the computer readable medium is an electrically erasable programmable read only memory.

25. The method of claim 20, wherein the remote location is a predetermined distance from the communications server.

26. The method of claim 21, wherein the global communications network is in the Internet.

27. The method of claim 21, wherein at least one from the following list of parameters is user configurable via a web page: current display type, language, power frequency, inactivity period, device identification code, date of last calibration, software version number, and hardware version number.

28. The method of claim 16, further comprising conveying cost data associated with the connecting, displaying, extracting, or loading.

29. The method of claim 28, further comprising processing a user payment in accordance with at least one of the conveyed cost data and predetermined cost information.

30. A method for diagnosing a detection device in a system, the system including a computer having a graphical user interface, a global communications network, and a communications server positioned in a location remote from the computer and the detection device, wherein the computer and the communications server are connected to the global communications network, the method comprising:

connecting the detection device to the computer;

establishing a communications session between the computer and the communications server via the global communications network;

activating a test mode associated with the detection device, the activating including retrieving historical data related thereto, wherein the historical data is retrieved from the communications server; and analyzing the detection device connected to the computer based at least upon the retrieved historical data, the analyzing providing analysis data via the graphical user interface.

31. The method of claim 30, wherein the global communications network includes the Internet.

32. The method of claim 30, further comprising conveying cost data associated with the connecting, establishing, activation, or analyzing.

33. The method of claim 32, further comprising processing a user payment in accordance with at least one of the conveyed cost data and predetermined cost information.

34. The method of claim 30, wherein the remote location is a predetermined distance from the communications server.

35. The method of claim 30, wherein the analysis data includes a continuous stream of data.

36. The method of claim 30, wherein the historical data includes at least one from the set including repair details, configuration download details, configuration download dates, and calibration data.

37. The method of claim 30, wherein the test mode includes a self-test test mode.

38. The method of claim 30, further comprising requesting operational data from the detection device.

39. The method of claim 38, herein the operational data includes a device identification code, wherein the method further comprises determining a type of the detection device based upon a received identification code.

* * * * *